United States Patent

[11] 3,624,370

[72] Inventor James Gray, Jr.
Wheaton, Ill.
[21] Appl. No. 874,192
[22] Filed Nov. 5, 1969
[45] Patented Nov. 30, 1971
[73] Assignee The United States of America as represented by the United States Atomic Energy Commission

[54] DIGITAL PLOTTING DEVICE
6 Claims, 5 Drawing Figs.
[52] U.S. Cl. .................................................. 235/151.3,
234/43, 235/61.1, 235/61.9, 346/29, 346/35
[51] Int. Cl. ................................................... G06k 15/22,
G01d 9/38
[50] Field of Search ...................................... 346/29, 35,
50; 234/42–43; 235/61.9, 61.10, 151.3

[56] References Cited
UNITED STATES PATENTS
2,889,189 6/1959 Cohen ............................ 346/35

Primary Examiner—Eugene G. Botz
Assistant Examiner—R. Stephen Dildine, Jr.
Attorney—Roland A. Anderson ABSTRACT: A digital plotting device receives information in digital form consisting of a most significant figure and at least one subsequent significant figure. The plotting device includes a plurality of printing hammers positioned opposite recording paper. A driving mechanism positions the plurality of hammers in response to the subsequent significant digits and actuates a particular printing hammer in response to the most significant digit. The actuated printing hammer marks the recording paper in the desired location.

DIGITAL PLOTTING DEVICE

CONTRACTUAL ORIGIN OF THE INVENTION

The invention described herein was made in the course of, or under, a contract with the United States Atomic Energy Commission.

BACKGROUND OF THE INVENTION

In many scientific experiments it is necessary to gather large amounts of data and perform statistical analyses of this data in order to make a measurement. In experiments involving nuclear radiation it is possible for many different reactions to occur. Each separate reaction must be recorded and evaluated to complete the measurement. Thus for a single measurement many thousands of separate datum may have to be accumulated.

In nuclear reactions, data has been accumulated by measuring the energy of each separate reaction, counting the number of reactions at each energy level, and plotting the number of reactions which occur at each energy level to develop an energy vs. intensity curve. A device called an analyzer is used for this purpose. Commercially available analyzers have a large number of separate memories called channels. Each time an event of a particular energy level is detached a count is stored in a predetermined channel. The number of events in each channel can then be plotted to analyze a particular experiment.

Because of the very large number of events and channels which must be plotted it is desirable to use some form of an automatic plotting device. These automatic plotting devices are usually analog plotters which have many disadvantages. They are relatively very slow and, since the data is stored in the analyzer in digital form, a digital to analog conversion is required for use with analog plotters. The digital plotters which are available are slaved to computers and are thus complex and costly. In order to plot the entire curve multicycle semilog plots are used. The use of a logarithmic plot requires a compromise in scale selection so that small, but important, detail may be lost or unimportant detail may be overemphasized. Changing the scale on an analog plotter requires precision adjustment of servoamplifiers with resultant cumulative errors and nonlinearity.

It is therefore an object of this invention to provide an improved device for plotting large quantities of digital information.

Another object of this invention is to provide a plotting device using digital techniques.

Another object of this invention is to provide a plotting device which does not have cumulative error or nonlinearity.

Another object of this invention is to provide a plotting in which the plotting scale and significant figures plotted can be easily changed.

Another object of this invention is to provide a plotting device having a significant increase in plotting speed.

SUMMARY OF THE INVENTION

In practicing this invention a point plotter is provided for plotting data stored in an analyzer. The analyzer has a plurality of separate channels, each channel having a plurality of registers with each register storing a separate significant digit of the data stored in the channel. The analyzer is responsive to a command signal to advance to a particular channel and readout consecutively the separate significant digits stored in each register of the channel.

The point plotter includes a printer for marking paper with a first positioning means to move the paper in a particular direction. A plurality of marking elements (solenoid-operated hammers) are arranged along a line transverse to the particular direction and adjacent the paper. A second positioning means acts to move the marking elements along the transverse line.

An input circuit receives the data from the analyzer and selects therefrom a plurality of significant digits including a most significant digit and subsequent significant digits. The second positioning means is responsive to the subsequent significant digits to position the plurality of marking elements in a desired position along the transverse line.

Control means is responsive to the received data to develop a control signal which is used to actuate the first positioning means to move the paper. The control means is further responsive to the positioning of the paper and the marking elements to select the one of the marking elements determined by the first significant digit and to actuate the same. Means are provided to change the X and Y scale of the plot and to select the most significant plurality of significant digits.

DETAILED DESCRIPTION OF THE INVENTION

Figure 1:
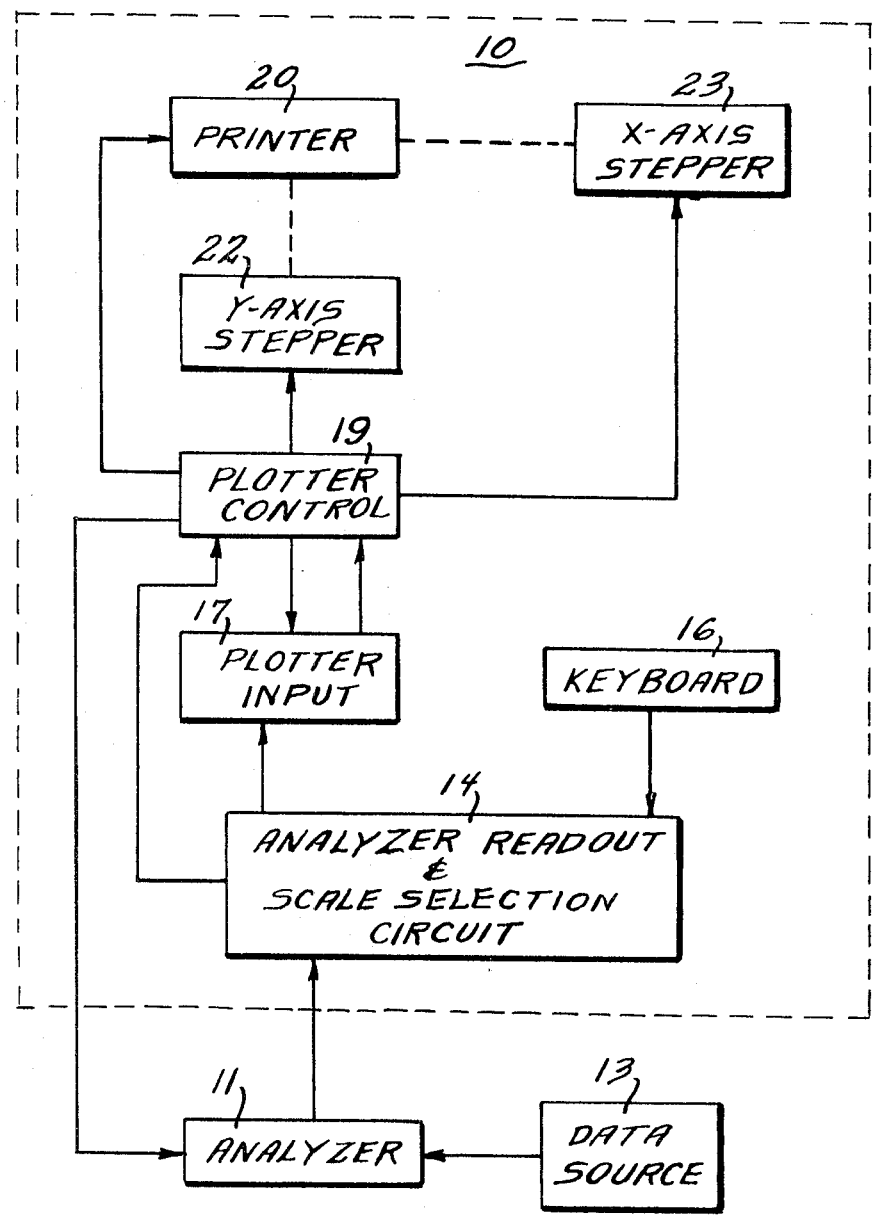
FIG. 1 is a block diagram of the point plotter of this invention.

Referring to FIG. 1 there is shown a block diagram of the plotter of this invention. The plotter 10 receives information from a data analyzer 11 and prints a plot or curve of this information. The data stored in analyzer 11 is received from data source 13 and may be, for example, measurements of the energy of large numbers of nuclear events. The data source 13 may include known gamma detectors, such as a Ge(Li) crystal, responsive to a nuclear event to develop an output signal proportional to the energy of the nuclear event. Large numbers of the energy levels thus detected are stored in analyzer 11, in a manner to be described. When sufficient data has been accumulated the data is read out to plotter 10 and plotted as points of a curve.

In operation data and synchronizing information from analyzer 11 is coupled to the analyzer readout and scale selection circuit 14. The analyzer readout 14 acts to develop the number or graph position (Y axis information) which is coupled to plotter input 17. The Y axis information is also scaled by analyzer readout 14 so that the data will automatically be printed in the desired scale. Synchronizing information is also developed for plotter control 19. A keyboard circuit 16 can be coupled to analyzer readout circuit 14 and plotter input 17 in place of analyzer 11 so that desired information can be plotted manually by the printer.

Plotter input circuit 17 develops control and synchronizing signals for plotter control 19 and also acts to round off the number received from analyzer 11 to the desired value. Pulses are developed by plotter input circuit 17 and are coupled to the plotter control 19 to position the Y axis stepper 22 and select the desired print hammer.

Plotter control 19 receives information from plotter input 17 and analyzer readout 14 acts to develop the driving pulses for the X axis stepper 23 and the Y axis stepper 22. When the X and Y axis steppers are properly aligned the plotter control selects the proper print hammer in printer 20 and actuates the same to mark a paper. The plotter control 19 then develops a signal which is coupled to the analyzer 11 to signal that the pointer is ready to plot next curve point. This operation continues until the data in the analyzer is plotted as a curve. The desired operation of point plotter 10 will be described in a subsequent portion of this specification.

Figure 2:
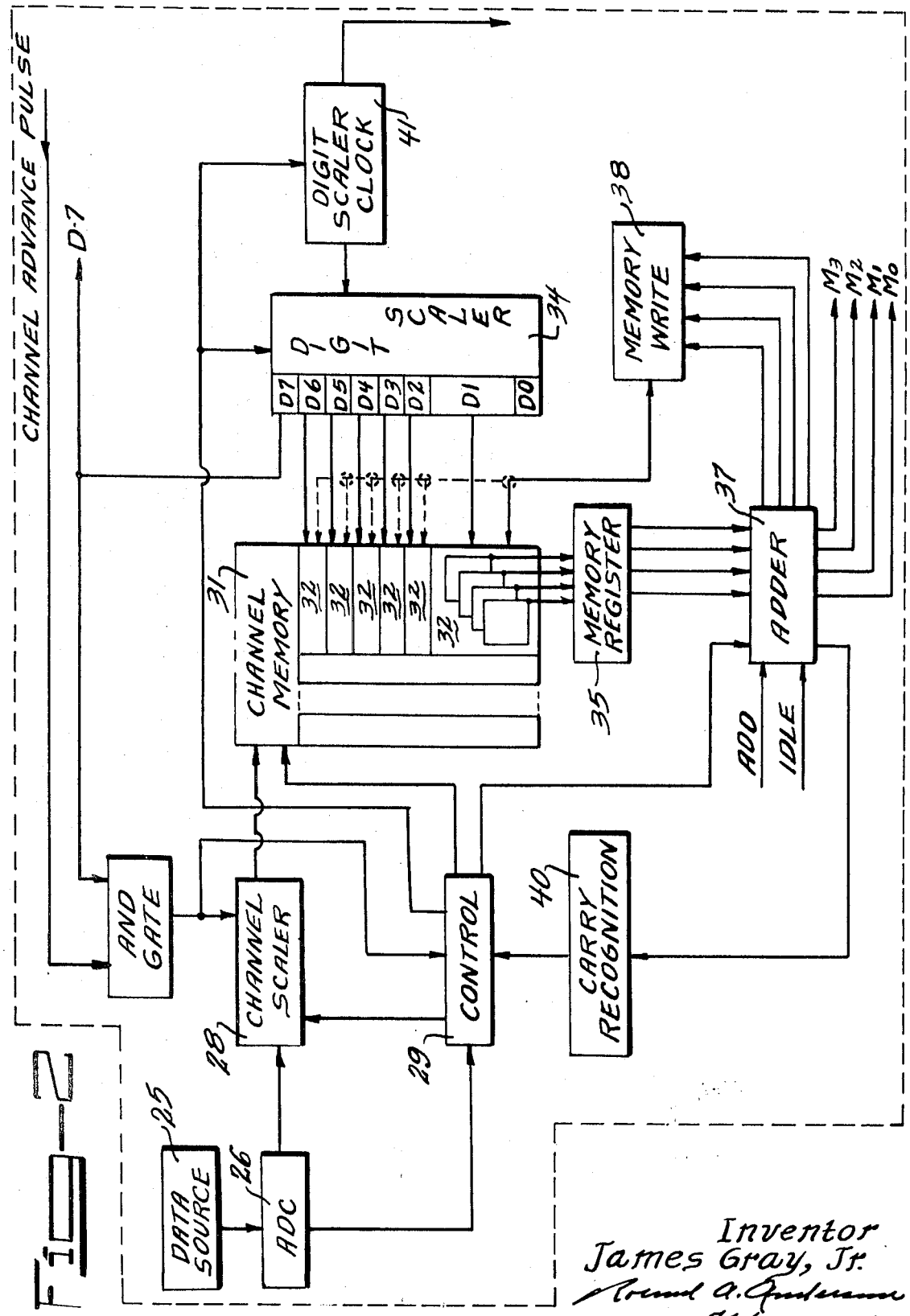
FIG. 2 is a block diagram of an analyzer used with the point plotter.

Referring to FIG. 2, data from the data source 25, in the form of an analog signal, is fed to the ADC (Analog to Digital Converter) 26. The analog signal might be from a radiation detector and the amplitude of the analog signal would represent the energy detected. A series of pulses representing the analog signal amplitude or the amount of energy is developed by the ADC 26. Thus, for example 100 pulses might represent 20 KeV and 200 pulses might represent 40 KeV. These pulses are developed by known techniques and form a digital signal which can be stored and further processed by digital techniques.

The series of pulses are fed to a channel scaler 28 causing the channel scaler to count the pulses and thus step to the channel memory 31 corresponding to the number of pulses counted. In a typical analyzer there may be 512 or 1,024 separate channels representing 512 or 1,024 separate energy levels. Each time an event of a particular energy level occurs it is recorded in the proper channel. Thus in this example the 20 KeV event produces 100 pulses and the channel scaler counts to 100 to select the proper channel for storage of the knowledge that this event has occurred. The 40 KeV event is stored in channel 200 in the same manner.

When the proper number of pulses have been read out (100 or 200 in this example) ADC 26 sends a pulse to the analyzer control 29 to start the read-in process. Each memory channel in the channel memory 31 has 6 levels, 32, for storing 6 decimal digits in binary coded decimal (BCD) form. A digit scaler in the form of a ring counter counting from D0 through D7 selects the desired level according to the control signals received from the control 29. During the read-in process the digit scaler is stepped to position D1 to transfer the least significant digit from the memory channel selected by channel scaler 34 to a memory register 35 and an adder 37. Adder 37 is set in the add mode and adds 1 to the quantity stored in the least significant digit position of the memory channel selected. The result is transferred back to the least significant digit position of memory 31 through memory write 38. At this point, if no carry is required, the control 29 resets digit scaler 34 to the D0 position and channel scaler 28 to its starting position ready to receive the next input.

If a carry to the next significant digit is required a signal is developed by carry recognition 40. Control 29 then steps digit scaler 34 to the D2 position and adds 1 to the amount in this channel register. The analyzer continues this process until no carry is required and then resets digit scaler 34 and channel selector 28 as previously described. A digit scaler clock 41 provides the clock pulses for operation of the digit scaler.

As described above data is continuously fed into the analyzer and stored in the proper channels according to the energy content of the measured data. This data is then to be read out and plotted. When the analyzer is read out, each channel of the channel memory 31 is read out in order. Thus channel scaler 28 starts at the first channel and counts through each of the channels in order. At each channel the data is read out one significant digit at a time starting with the most significant digit. Thus the digit scaler counts in reverse order to read out. That is in the analyzer mode the digit scaler 34 starts at D0 and counts D0 - D1 - D2 - D3 D4 - D5 - D6 - D7 - D0. In the readout mode the digit scaler 34 starts at D7 and counts D7 - D6 - D5 - D4 - D3 - D2 - D1 - D0 - D7.

When digit scaler 34 counts from D0 to D7, an advance pulse is developed and sent to the channel scaler 28 to step channel scaler 28 to the next channel. However, when used with the point plotter of this invention the internally developed advance pulse is disabled and an advance pulse, developed in the point plotter, is used to step the channel scaler to the next channel. It is necessary to do this as digit scaler 34 can electronically interrogate the different significant digit registers of each channel at a rate considerably greater than the mechanical action of the printer can plot the point.

The output number from each digit register of the channel interrogated is fed to adder 37, as in the analysis or record mode. Adder 37 is set in the idle mode and does not add any quantity to the number. The number is transferred to the output lines $M_0$, $M_1$, $M_2$, $M_3$ as a BCD number and to memory write 38 to be rewritten in the digit register interrogated. The above is a description of commercially available analyzers and is not part of this invention.

Figure 3:
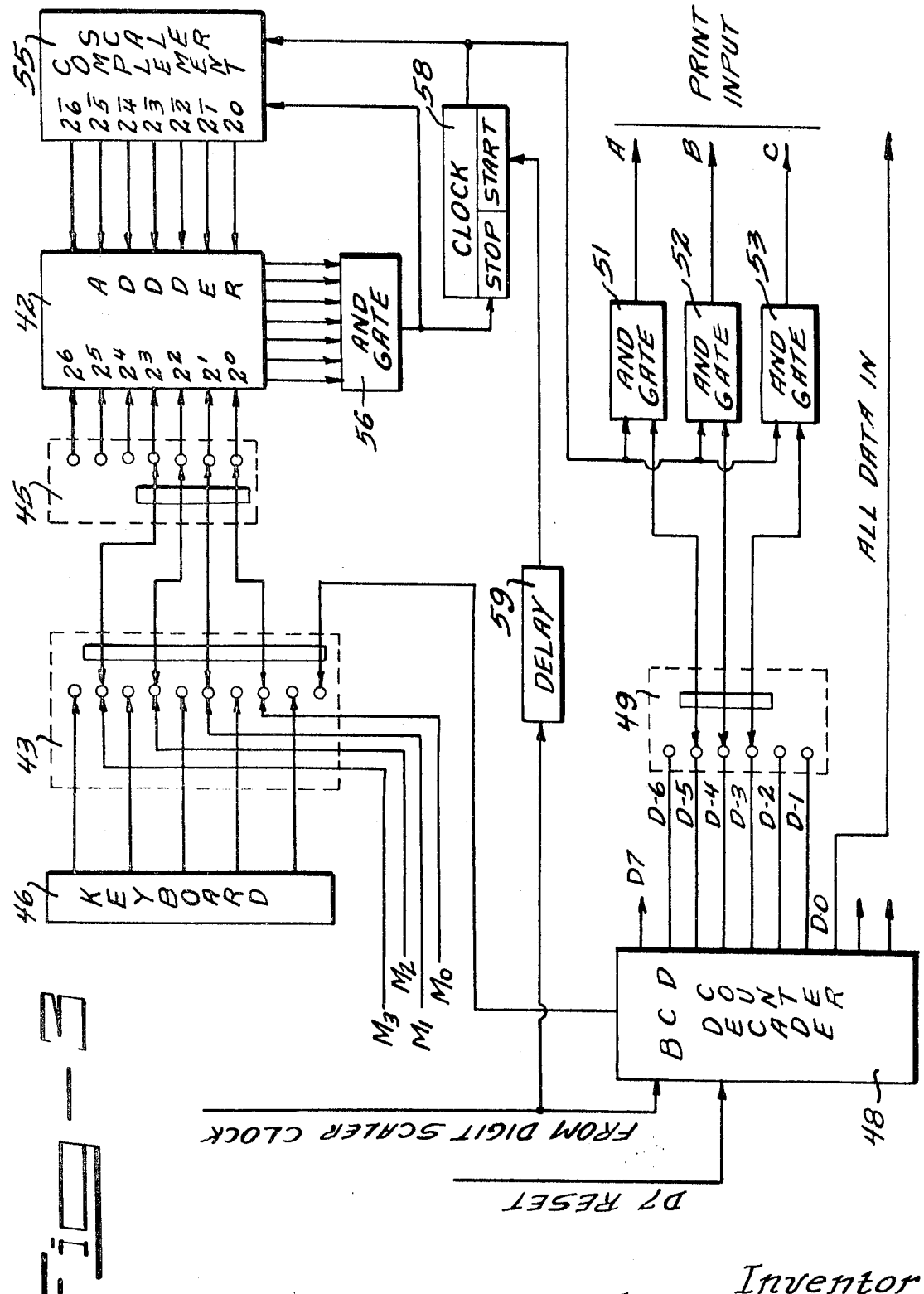
FIG. 3 is a block diagram of the analyzer readout and scale selection circuit of the point plotter.

Referring to FIG. 3 the BCD number stored in each digit register of each channel of the analyzer is transmitted to the printer over four wires, $M_0$, $M_1$, $M_2$, $M_3$. This number is transferred to a seven-bit adder 42, as one input thereof, through an external keyboard transfer switch 43 and a multiply scale switch 45. With the exterior keyboard switch 43 in the keyboard position the input to adder 42 is from a keyboard 46 which permits manual introduction of data to the point plotter. With exterior keyboard switch 43 in the exterior position data is received from the analyzer.

The BCD decade counter 48 forms a "digit sclaer" for use by the point plotter in synchronizing its operation. While it would be possible to use the analyzer digit scaler 34 of FIG. 2 it is easier to use a separate "digit scaler" in the point plotter as no modification of the analyzer is required.

The inputs to BCD decade counter 48 from the analyzer are the digit scaler clock pulses and the D7 pulse. The D7 pulse acts to reset BCD decade counter 48 to the 0-position while the clock pulses cause the BCD decade counter to count from 0 to 7. The BCD decade counter does not reach 9 since the D7 reset pulse is received before this point is reached. BCD decade counter 48 develops an output on one of 10 lines according to the number in BCD decade counter 48. D7 is the start position. D6 through D1 represents the six significant digits of each channel and D0 is the position which develops the ADI (all data in) pulse. With exterior keyboard transfer switch 43 in the keyboard position an output from keyboard 46 is coupled to BCD decade counter 48 to develop the synchronizing signals.

The most significant digit switch 49 is coupled to the D1 to D6 outputs from BCD decade counter 48 and selects the three most significant digits by selecting three consecutive ones of the D1 through D6 outputs.

The three selected significant digits are coupled to AND-gates 51, 52 and 53 which are coupled to the printer inputs. AND-gates 51–53 are enabled one at a time in the manner described below as the significant digits are read out of the analyzer. Assume that most significant digit selector switch 49 is connected to D3, D4 and D5 and the digit scaler 34 is in reset position D7. The advance pulse causes the channel scaler 28 of FIG. 2 to move to the next channel and also starts the digit scaler 34 interrogating the new channel. Digit scaler 34 first steps to D6 and the number stored therein (in BCD code) is sent to adder 42 over four wires in parallel. The number in BCD form is changed to a series of pulses in a manner to be described and coupled to each of the AND-gates 51–53 in parallel.

BCD decade counter 48 forms a second digit scaler in synchronism with the digit scaler 34 of the analyzer. As the analyzer digit scaler 34 steps from D7 to D6 the BCD decade counter 48 also steps from D7 to D6. However, since the most significant digit selector switch 49 is not connected to D6 AND-gates 51–53 are not enabled and no signal is fed to the printer input registers.

The digit scaler 34 and BCD decade counter 48 next step to D5 and the number in the D5 register of the selected channel of the analyzer is fed to adder 42 to develop a series of pulses which are coupled to each of AND-gates 51–53 in parallel. AND-gate 51 is enabled through line D5 so that the series of pulses are coupled to the first input register of the point plotter. This is repeated for the numbers stored in channel registers D4 and D3 and these numbers are stored in the proper input registers of the point plotter. The positions D1 and D2 are not connected by the most significant digit selector switch 49 to AND-gates 51–53 so the numbers stored in these channel registers are not fed to the point plotter. Thus three out of the six digits of the channel are transferred to the input registers of the point plotter.

When the digit scaler 34 and the BCD decade counter 48 reach the D0 position all of the data to be plotted as a single point has been transferred to the point plotter and an ADI (all data in) pulse is developed. The BCD decade counter 48 and digit scaler 34, in synch, step to the next position, D6 for digit scaler 34 and an unused position for BCD decade counter 48. The D7 position is a rest position and the D7 pulse from the digit scaler 34 resets BCD decade counter 48 to the D7 position.

As previously described the number in the channel memory representing each significant digit is connected as one input of a seven-bit adder 42. The other input to the adder is the complement of a binary counter 55 initially set at zero. If the number from the channel register is also zero the sum (without carry) is 1111111. The output of each stage of the adder 42 is fed to and AND-gate 56 and with the output all ones, an output signal is fed to a clock 58 to stop the clock. The output of AND-gate 56 also acts to reset the complement counter 55 to zero.

If for example the number 9 is received in BCD code from the analyzer, the input to adder 45 would be (seven bits)

```
                                    0001001
The complement from the counter 55 (0)  1111111
The sum no carry                    1110110
```

The stop signal from the AND-gate 56 would then no longer be present.

The clock signal from the digit scaler clock 41 which advances the scaler 34 is received by the point plotter. This clock signal is delayed in delay circuit 59 and used to start clock 58. Clock 58 is connected to complement counter 55 and to each of the AND-gates 51–53. If one of AND-gates 51–53 is enabled, as previously described, the pulses from clock 58 are coupled to the point plotter input register connected to that AND-gate. An example of counting follows with the number 5 in the channel register.

Initial conditions input

Number 5 (in seven bits)       0000101
Signal from complement counter (Zero)  1111111
Sum no carry                   1111010

| Clock 58 Pulse Number | Complement Ctr. 55 Count | Complement | Sum |
|---|---|---|---|
| 0 | 0000000 | 1111111 | 1111010 |
| 1 | 0000001 | 1111110 | 1111011 |
| 2 | 0000010 | 1111101 | 1111000 |
| 3 | 0000011 | 1111100 | 1111001 |
| 4 | 0000100 | 1111011 | 1111110 |
| 5 | 0000101 | 1111010 | 1111111 stop pulse |

Thus five clock pulses would be fed into the proper point plotter input register through the enabled AND-gate.

The use of a seven-bit adder 42 permits scale multiplication by shifting the position of the input number from the analyzer. Thus there is no multiplication if the four-bit BCD number is connected to the four lowest bits of the adder 42. However, if the four-bit BCD number is connected to bits 2 through 5 of adder 42, the number of pulses from the clock required to generate a stop pulse is doubled and the scale of the printer is multiplied by two. If adder 42 bit positions 3 through 6 are used the scale multiplications is 4 and if adder bit positions 4 through 7 are used the scale multiplication is 8.

An example of 2 times multiplication follows. The input number from the analyzer is 5 as in previous example.

Using adder bit positions 2 through 5 the input to the adder is 0001010.

| Clock pulse No. | Complement Ctr. Count | Complement | Sum |
|---|---|---|---|
| 0 | 0000000 | 1111111 | 1110101 |
| 1 | 0000001 | 1111110 | 1110100 |
| 2 | 0000010 | 1111101 | 1110111 |
| 3 | 0000011 | 1111100 | 1110110 |
| 4 | 0000100 | 1111011 | 1110001 |
| 5 | 0000101 | 1111010 | 1110000 |
| 6 | 0000110 | 1111001 | 1110011 |
| 7 | 0000111 | 1111000 | 1110010 |
| 8 | 0001000 | 1110111 | 1111101 |
| 9 | 0001001 | 1110110 | 1111100 |
| 10 | 0001010 | 1110101 | 1111111 stop |

Figure 4:
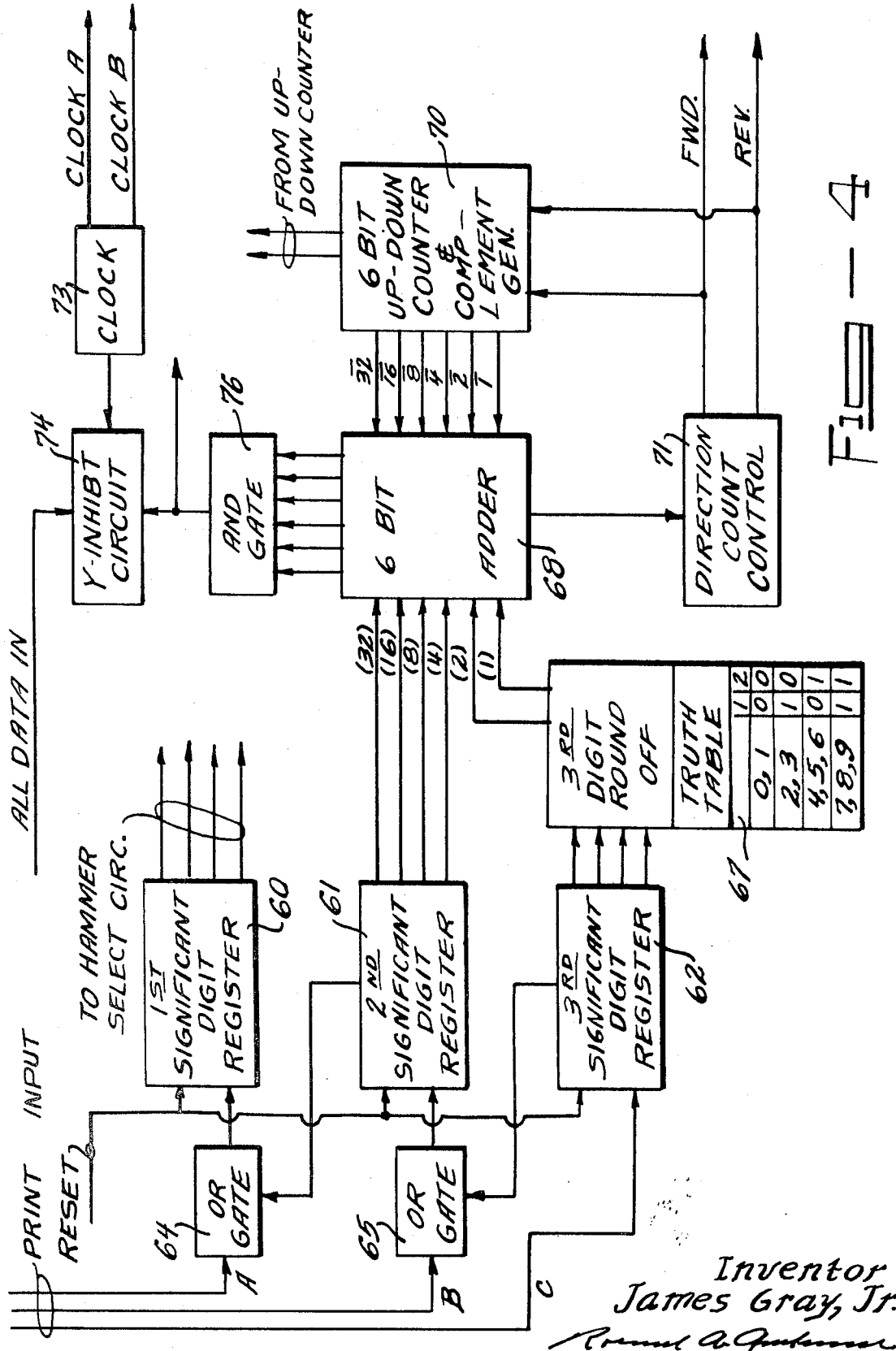
FIG. 4 is a block diagram of the input circuit of the point plotter.

Referring to FIGS. 3 and 4 the outputs from AND-gates 51, 52 and 53 are coupled to the significant digit registers 60, 61 and 62 over lines A, B and C. The lines A and B are coupled to registers 60 and 61 through OR-gates 64 and 65 respectively. Each number is received as a series of pulses and stored as a BCD number in the proper register.

OR-gates 64 and 65 are used to carry numbers from one register to the next significant digit register. This is necessary if a multiplying factor is used. For example, if the third significant digit is 6 and a multiplying factor of 2 is used 12 pulses would be received by register 62. Register 62 would count from 0 to 9, and on the tenth pulse switch back to 0 and develop a carry of 1. Register 62 would then count the eleventh and twelfth pulses as one and two. The carry pulse would be sent to register 61 through OR-gate 65 and would be added to the number in register 61. Any carry over from register 61 would be sent to register 60 through OR-gate 64 in the same manner.

The number in the second and third significant digit registers 61 and 62 are combined and used to position a plurality of printing hammers along the Y-axis. The numbers in the first significant digit register 60 is used to select the particular printing hammer which is to be actuated.

While the three decimal digits stored in the registers 60–62 are to be plotted, it is not necessary to plot to this accuracy. The distance between successive integers of the third significant digit, as plotted, is so small as to be negligible. Therefore, it is simpler to "round off" the third significant digit. This is done in the round off circuit 67 which is a matrix developing a two-bit number representing the third significant digit according to the truth table shown. The two-bit number is combined with the binary coded decimal number for the number stored in register 61 to provide a six-bit input to adder 68. This six-bit number represents the combination of the "rounded off" third significant digit and the second significant digit.

The second input to adder 68 is the complement of a six-bit number from up-down counter 70. Up-down counter 70 can count forward or backward as required. The input numbers are added and if a carry exists it is applied to the direction count control circuit 71. If there is a carry the number in the up-down counter 70 is too small so that a signal is applied to counter 70 from the direction count control 71 to cause counter 70 to count in the forward direction. If there is no carry the number in up-down counter 70 is too large and the counter will count backwards or down to reach the correct number.

In this system up-down counter 70 does not return to 0 after each input. Since the Y-axis stepping motor follows up-down counter 70 it also does not return to 0 but moves forward or in reverse according to the direction in which the up-down counter counts. Thus the hammers do not need to return to a 0-position after each plot. Since successive plots are likely to be close together and in any event closer to the last plot than to a 0-position time is saved in moving the Y-axis hammers directly to the next position instead of returning to 0 after each plot. The plotting speed of this point plotter is significantly greater than prior art printers. As an example a plotter has been constructed in which the maximum plotting speed is 120 channels per second, the average plotting speed is 33 channels per second and the minimum plotting speed is 7 channels per second.

Clock pulses from clock 73 are applied to up-down counter 70 through inhibit circuit 74. These pulses cause counter 70 to count up or down according to the control signals from direction count control 71. Inhibit circuit 74 normally acts to block the clock pulses until an ADI signal is received and there is no inhibit signal from AND-gate 76. When each stage of adder 68 is 1 (the numbers in digit registers 61 and 62 are the same as the number in up-down counter 70), AND-gate 76 is enabled and an inhibit signal is sent to inhibit circuit 74. The inhibit signal acts to block the clock signals from reaching up-down counter 70 until the inhibiting signal from AND-gate 76 is removed and an ADI signal is received. The inhibit signal from AND-gate 76 is removed only when the number in up-down counter 70 is different from the number in digit registers 61 and 62.

Figure 5:
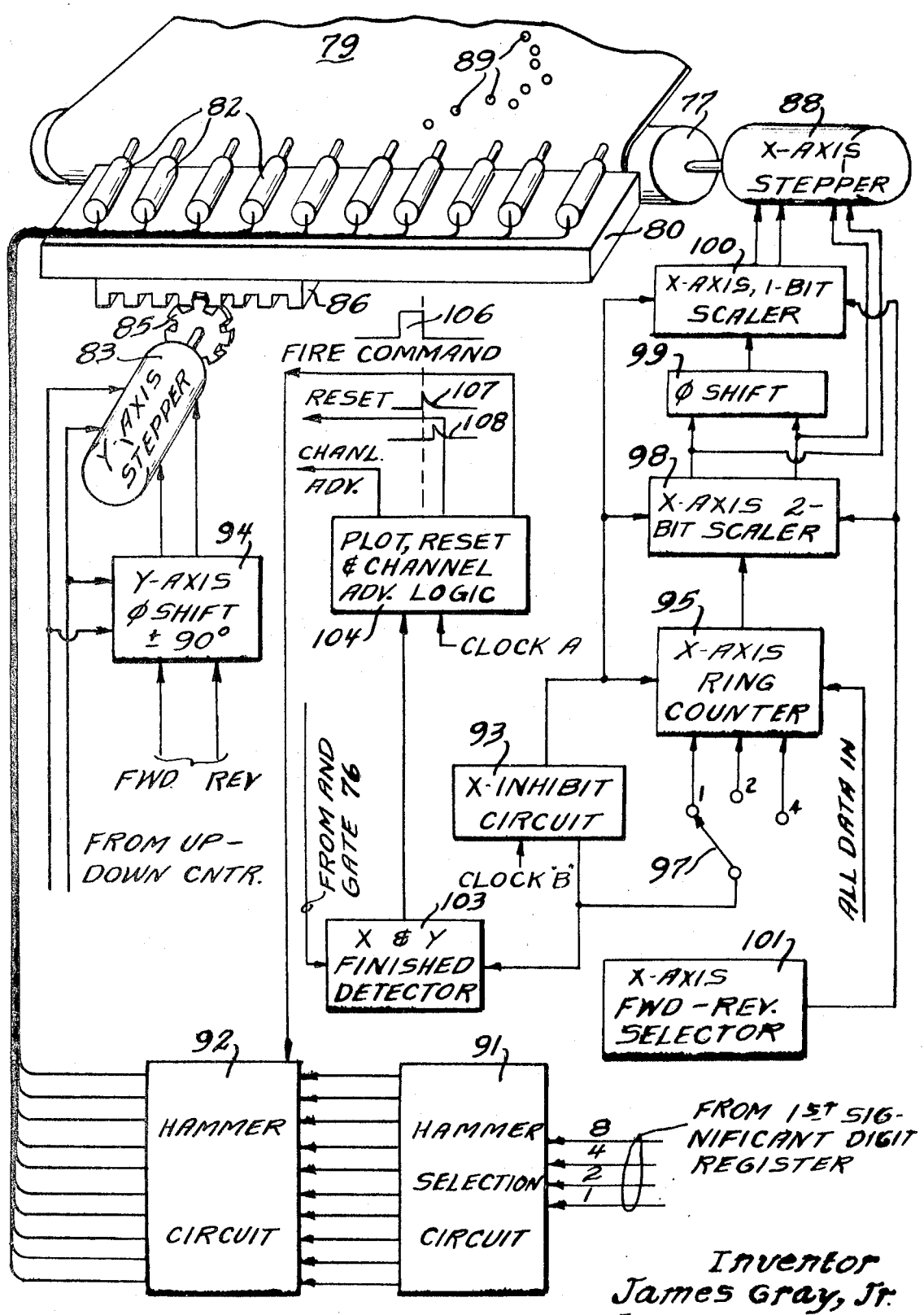
FIG. 5 is a block diagram of the control and printing portion of the point plotter.

Referring to FIG. 5 there is shown the printing mechanism for the point plotter. A platen 77 is provided for carrying the paper 79 upon which the plot is to be made. A bar 80 is mounted adjacent the platen 77 and carries the print hammers 82. The Y-axis stepping motor 83 is connected to bar 80 through gear 85 and rack 86 so that rotation of the stepping motor 83 will cause print hammers 82 to be moved along an axis parallel to the longitudinal axis of the platen 77. An X-axis stepping motor 88 is connected to platen 77 to move the point plotter along the X-axis by rotation of platen 77. X-axis multiplication can be achieved by rotating the platen 77, one, two or four steps for each Y-axis plot. After the X- and Y-axis stepping motors 88 and 83 have been positioned, a selected one of the print hammers 82 is actuated to plot a point 89 on paper 79.

The Y-axis position is selected in two concurrent steps. The first significant digit stored in register 60 of FIG. 4 is coupled as a BCD number to hammer selection circuit 91. Hammer selection circuit 91 selects the one of ten hammers corresponding to the number in register 60. The hammer driver 92 provides the power required to actuate the selected hammer upon receipt of a fire command signal.

Pulse signals from up-down counter 70 of FIG. 4 are coupled to the Y-axis stepper motor 83 as one input. The same signals, shifted in phase by 90° in Y-axis phase shift 94, provide another input. Stepping motor 83, in response to the second and third significant digits, positions the selected hammer at the desired point. The total movement of the hammers 82 by the Y-axis stepping motor 83 is equal to the distance between hammers. A signal from direction count control circuit 71 is also applied to Y-axis phase shift 94 to determine if the phase shift is to be plus or minus 90°. By this means stepping motor 83 moves hammers 82 right or left across platen 77 as up-down counter counts forward or backward. Using the clock B signals from X inhibit circuit 93 the X-axis ring counter 95 provides the signals required to drive the X-axis stepping motor 88. Upon receipt of the ADI pulse X-axis ring counter 95 develops one, two or four pulses depending upon the position of the selector switch 97. These pulses are generated in synchronism with clock signal B from clock 73 of FIG. 4. When the desired number of pulses have been developed by X-axis ring counter 95 an inhibit signal is applied to X inhibit circuit 93 to inhibit the clock pulses therefrom. The clock pulses from X inhibit circuit 93 and the output of the X-axis scale counter is coupled to the X-axis two-bit scaler 98 to generate the pulses required to move the stepper motor in accordance with the selected number of pulses from ring counter 95. By this means the X-axis spacing or scale can be varied as desired.

The output of the X-axis two-bit scaler 98 is coupled to the X-axis stepping motor and phase shift circuit 99. The output of the phase shift circuit 99 is coupled to a one-bit scaler 100 to develop pulses shifted in phase by ±90° according to the setting of the X-axis FWD-REV selector 101. The output of the X-axis one-bit scaler 100 is coupled to the X-axis stepping motor 88.

After the plotter has been positioned on its X- and Y-axis the selected hammer is fired and the significant digit registers are cleared. When the X-axis ring counter 95 has counted to the number selected by the selector 97 an output pulse is developed which is coupled to the X and Y finished detector 103 through selector switch 97. This output pulse indicates that the X-axis has been moved to the desired position.

The second input to X and Y finished detector 103 is the output of AND-gate 76 FIG. 4 which is present when the Y-axis is positioned. With both X- and Y-axis in position the output X and Y finished detector 103 actuates the plot, reset and channel advance logic 104. The next clock pulse received by the logic 104 after logic 104 is actuated (clock pulse A from clock 73, FIG. 4) acts to generate a fire command pulse 106, a reset pulse 107 and a channel pulse 108. The duration of the fire command pulse is twice the period of a clock pulse. The reset pulse 107 is generated at the trailing edge of the fire command pulse 106 and the channel pulse 108 is generated after a short delay after the trailing edge of the fire command pulse 106.

The fire command pulse 106 is coupled to the hammer driver circuit 92 to actuate the selected hammer. The reset pulse 107 is coupled to each of the significant digit registers 60–62 to reset them to 0-preparatory to receiving the data stored in the next channel. The channel advance pulse 108 is coupled back to the analyzer to advance the analyzer to the next channel where the readout procedure is repeated.

The embodiments of the invention in which an exclusive property or privilege is claimed are defined as follows:

1. A plotting device for plotting data stored in a plurality of separate analyzer channels, each of the channels having a plurality of registers with each register storing a separate significant digit of the data stored in the channel, the analyzer being responsive to a command signal to advance to a particular channel and consecutively read out the separate significant digits stored in the register of the particular channel, including in combination, recording means, first positioning means for moving said recording means in particular direction, a plurality of marking elements arranged in a line transverse to said particular direction adjacent said recording means, second positioning means for moving said plurality of marking elements along said transverse line, input means coupled to the analyzer for receiving the data from each register of a particular channel and selecting therefrom a most significant digit and at least one subsequent significant digit, said input means further including binary-adding means coupled to the analyzer for consecutively receiving the significant digits stored therein with each digit being received in four-bit binary coded decimal form, said binary adding means having a plurality of stages greater than four with four consecutive stages being coupled to the analyzer, complement counter means having a plurality of binary stages each coupled to a separate stage of said binary-adding means, clock means coupled to said complement counter means for applying a series of clock pulses thereto, said complement counter means being responsive to said series of clock pulses to count the same and apply the complement of said number of clock pulses to said adding means, output means coupled to each of said plurality of stages of said adding means for developing an output pulse with said series of pulses being equal in number to an integral multiple of the number in the analyzer register interrogated, said clock means being coupled to said output means and being responsive to said output pulse to stop said series of pulses, said input means further being coupled to said second positioning means and said plurality of marking elements, said second positioning means being responsive to said subsequent significant digits to position said plurality of marking elements in a desired position along said transverse line, control means coupled to said input means and said second positioning means and being responsive to said received data to develop a control signal, said first positioning means being coupled to said control means and being responsive to said control signal to position said recording means, said control means further being responsive to said positioning of said recording means and said marking elements to generate a marking signal, said input means being responsive to said marking signal and said most significant digit to select one of said plurality of marking elements and actuate the same whereby a plot is made at a desired position in said recording means.

2. The point plotter of claim 1 wherein, said input means further includes switch means for connecting the analyzer to said four consecutive stages of said adding means.

3. A plotting device for plotting data stored in a plurality of separate analyzer channels, each of the channels having a plurality of registers with each register storing a separate significant digit of the data stored in the channel, the analyzer being responsive to a command signal to advance to a particular channel and consecutively read out the separate significant digits stored in the register of the particular channel, including in combination, recording means, first positioning means for moving said recording means in a particular direction, a plurality of marking elements arranged in a line transverse to said particular direction adjacent said recording means, second positioning means for moving said plurality of marking elements along said transverse line, input means coupled to the analyzer for receiving the data from each register of a particular channel and selecting therefrom a most significant digit and at least one subsequent significant digit, said input means further includes synchronizing means coupled to the analyzer, said synchronizing means having a plurality of outputs equal in number to the number of registers in each channel of the analyzer, said synchronizing means further acting to develop synchronizing pulses on consecutive ones of said plurality of outputs as consecutive digits are read out of the analyzer, a plurality of input memory means, input pulse generation means coupled to the analyzer for generating a series of pulses equal to an integral multiple of said digit being read out of the analyzer, a plurality of AND-gates each coupled to a separate one of said plurality of input memory means, said plurality of AND-gates being coupled to separate ones of said plurality of outputs and to said input pulse generation means in parallel, each of said plurality of AND-gates being enabled in sequence in response to said synchronizing pulse applied thereto to couple said series of pulses to said input memory means coupled thereto, said input means further being coupled to said second positioning means and said plurality of marking elements, said second positioning means being responsive to said subsequent significant digits to position said plurality of marking elements in a desired position along said transverse line, control means coupled to said input means and said second positioning means and being responsive to said received data to develop a control signal, said first positioning means being coupled to said control means and being responsive to said control signal to position said recording means, said control means further being responsive to said positioning of said recording means and said marking elements to generate a marking signal, said input means being responsive to said marking signal and said most significant digit to select one of said plurality of marking elements and actuate the same whereby a plot is made at a desired position on said recording means.

4. The point plotter of claim 3 wherein, said plurality of input means and said plurality of AND-gates are equal in number and less than the number of said plurality of outputs, switch means having a plurality of switch connections each coupled to a separate one of said AND-gates, said switch means being movable to connect said switch connection to consecutive ones of said plurality of outputs.

5. A plotting device for plotting data stored in a plurality of separate analyzer channels, each of the channels having a plurality of registers with each register storing a separate significant digit of the data stored in the channel, the analyzer being responsive to a command signal to advance to a particular channel and consecutively read out the separate significant digits stored in the register of the particular channel, including in combination, recording means, first positioning means for moving said recording means in a particular direction, a plurality of marking elements arranged in a line transverse to said particular direction adjacent said recording means, second positioning means for moving said plurality of marking elements along said transverse line, input means coupled to the analyzer for receiving the data from each register of a particular channel and selecting therefrom a most significant digit and at least one subsequent significant digit, The received data are in the form of three significant digits with each digit in binary-coded decimal form having four bits, said input means including first, second and third significant digit registers with the most significant digit received being stored in said first significant digit register, the second most significant digit being stored in said second significant digit register and the third most significant digit being stored in said third significant digit register, digit round off means coupled to said third significant digit register means for developing a two-bit number representative of said third significant digit, an adder coupled to said second significant digit register and said digit round off means having six separate binary stages, said four-bit second significant digit and said two-bit rounded off third significant digit forming a six-bit input number with each bit coupled to a separate one of said adder stages, counter means having six binary stages to develop a six-bit number with each binary stage being coupled to a separate one of said added stages, AND-gate means having a plurality of inputs each coupled to a separate one of said adder stages, clock means coupled to said counter means and said AND-gate means, said clock means acting to develop a series of clock pulses, said counter means acting to count said series of clock pulses and to develop an output number therefrom equal to the complement of the number counted, said adder means acting to add said six-bit input number and said output number, said AND-gate means being responsive to a predetermined state of each of said adder stages to develop an inhibit pulse, said clock means being responsive to said inhibit pulse to block said series of pulses from said counter means, said counter means further being coupled to said second positioning means for applying said series of clock pulses thereto to cause said plurality of marking elements to be moved along said line, said input means further being coupled to said second positioning means and said plurality of marking elements, said second positioning means being responsive to said subsequent significant digits to position said plurality of marking elements, in a desired position along said transverse line, control means coupled to said input means and said second positioning means and being responsive to said received data to develop a control signal, said first positioning means being coupled to said control means and being responsive to said control signal to position said recording means, said control means further being responsive to said positioning of said recording means and said marking elements to generate a marking signal, said input means being responsive to said marking signal and said most significant digit to select one of said plurality of marking elements and actuate the same whereby a plot is made at a desired position on said recording means.

6. The point plotter of claim 5 further including direction count control means, coupled to said adder and said counter means, said adder means being responsive to a number therein greater than a six-bit number to develop a carry signal, said direction control means being responsive to said carry signal to cause said counter means to count in a predetermined direction, said direction control means being responsive to the absence of said carry signal to cause said counter means to count in a direction opposite to said predetermined direction.

* * * * *

UNITED STATES PATENT OFFICE
CERTIFICATE OF CORRECTION

Patent No. 3,624,370          Dated November 30, 1971

Inventor(s) James Gray, Jr.

It is certified that error appears in the above-identified patent and that said Letters Patent are hereby corrected as shown below:

Col. 1, line 25, change "detached" to --detected--.

Col. 2, line 70, change "desired" to --detailed--.

Col. 3, line 10, after "channel" insert --in channel--.

line 43, change "selector" to --scaler--.

line 55, insert a hyphen between "D3" and "D4".

Col. 4, line 13, correct spelling of "scaler".

Col. 5, line 58, change "of" to --if--.

Col. 8, line 8, after "channel" insert --advance--.

line 11, after "channel" insert --advance--.

line 17, after "0" delete the hyphen.

Col. 10, line 7, change "The" to --the--.

Signed and sealed this 6th day of June 1972.

(SEAL)
Attest:

EDWARD M. FLETCHER, JR.
Attesting Officer

ROBERT GOTTSCHALK
Commissioner of Patents